US005680808A

United States Patent [19]

Day et al.

[11] Patent Number: 5,680,808

[45] Date of Patent: Oct. 28, 1997

[54] FLUID CYLINDER AND METHOD OF ASSEMBLY

[75] Inventors: Gordon M. Day; Joseph L. Meloche, both of Bryan, Ohio

[73] Assignee: Ingersoll-Rand Company, Woodcliff Lake, N.J.

[21] Appl. No.: 647,250

[22] Filed: May 9, 1996

[51] Int. Cl.$^6$ .......... F16J 15/18

[52] U.S. Cl. .......... 92/168; 92/169.1

[58] Field of Search .......... 92/128, 165 R, 92/168, 169.1

[56] References Cited

U.S. PATENT DOCUMENTS

| | | | |
|---|---|---|---|
| 2,890,917 | 6/1959 | Prince . | |
| 3,043,639 | 7/1962 | Maha | 92/169.1 |
| 3,113,490 | 12/1963 | Weaver . | |
| 3,122,063 | 2/1964 | Chorkey | 92/168 |
| 3,494,652 | 2/1970 | Langland . | |
| 3,598,021 | 8/1971 | Langland et al. | 92/169.1 |
| 3,650,182 | 3/1972 | Phillips . | |
| 3,881,401 | 5/1975 | Bimba . | |
| 4,531,452 | 7/1985 | Spielmann et al. | 92/168 |
| 4,532,856 | 8/1985 | Taylor | 92/168 |
| 5,375,507 | 12/1994 | Kladiwa et al. . | |
| 5,465,647 | 11/1995 | Fish . | |

*Primary Examiner*—F. Daniel Lopez
*Attorney, Agent, or Firm*—Michael M. Gnibus

[57] ABSTRACT

A fluid cylinder comprising a tube having a sidewall and at least one open end, the sidewall has a locking groove formed therein adjacent each of the at least one open ends, each of the open ends includes an edge which includes a chamfer. The fluid cylinder also includes at least one endcap for closing the at least one open end, each of the at least one endcaps comprising: a leading end having a groove formed therein, said groove adapted to receive a compressible retaining ring, the retaining ring adapted to engage the locking groove when the at least one open end is closed by the at least one endcap. Each of the endcaps also includes a shoulder and a sealing member located between the leading end and the shoulder, the sealing member is adapted to sealingly engage the edge of the at least one open end. The sealing member includes a base and a lip made integral with the base, the lip including along one side, said chamfer adapted to engage the chamfered tube edge, said lip adapted to be movable between a first position where the lip is substantially parallel to the shoulder and a second position where the lip is in abutment with the shoulder.

19 Claims, 4 Drawing Sheets

FLUID CYLINDER AND METHOD OF ASSEMBLY

FIELD OF THE INVENTION

This invention generally relates to a fluid cylinder and to a method of assembling the same.

BACKGROUND OF THE INVENTION

Fluid cylinders and more particularly, piston type fluid cylinders are used to convert pneumatic line pressure into linear thrust.

Such known fluid cylinders are typically comprised of a large number of discrete component parts generally including an elongate, hollow barrel or casing having a pair of open ends; a piston member adapted to be movable linearly in the barrel; a piston rod connected to the piston; a pair of endcaps for closing the open barrel ends; a plurality of discrete seal members adapted to be located between the endcaps and barrel; and a bushing member fitted in the endcaps for supporting the rod. The discrete seal members between the piston and barrel and the endcap and piston rod are frequently dynamic seals that are actuated pneumatically and create a pressure differential between the cylinder and ambient air.

During assembly of conventional piston type fluid cylinders, the piston and rod are assembled with the required seals and a subassembly comprised of the piston, rod and seals is inserted into the barrel chamber. The endcaps are then located in the open ends of the barrel and the barrel is crimped onto the endcaps. The crimping step of the assembly operation is quite involved and in order to successfully complete the crimping step of the assembly operation, use of a crimping machine, designed specifically to perform the crimping operation, is required.

When the assembled fluid cylinder is placed in the field for use, it may be necessary to move the endcaps in order to relocate the fluid cylinder inlet and discharge port from their assembled positions in order to flow connect the ports with existing flow-pipes. The crimped endcaps make relocation of the ports impossible.

As indicated by the foregoing summary, conventional fluid cylinders are comprised of a large number of discrete parts, are difficult to assemble and relocation of cylinder ports is impossible.

The foregoing summary illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a fluid cylinder comprising: a tube having a sidewall and at least one open end, the sidewall having a locking groove formed therein adjacent each of the at least one open ends each of the open ends includes an edge; at least one endcap for closing the at least one open end. Each of the at least one endcaps includes a leading end having a groove formed therein, said groove adapted to receive a compressible retaining ring, the retaining ring adapted to engage the locking groove when the at least one open end is closed by the at least one endcap. Each of the at least one endcaps also includes a shoulder and a sealing member located between the leading end and the shoulder, said sealing member adapted to sealingly engage the edge of the at least one open end.

The foregoing and other aspects will become apparent from the following detailed description of the invention when considered in conjunction with the accompanying drawing figures.

BRIEF DESCRIPTION OF THE DRAWING FIGURES

FIG. 1 is a longitudinal sectional view of the fluid cylinder of the present invention;

FIG. 2*a* is a sectional view of a portion of the sectional view of FIG. 1, showing a first step in the assembly of the fluid cylinder;

FIG. 2*b* is an enlarged sectional view of a portion of the longitudinal sectional view of FIG. 1, showing a portion of the assembled fluid cylinder;

DETAILED DESCRIPTION OF THE PREFERRED EMBODIMENT

Figure 1:
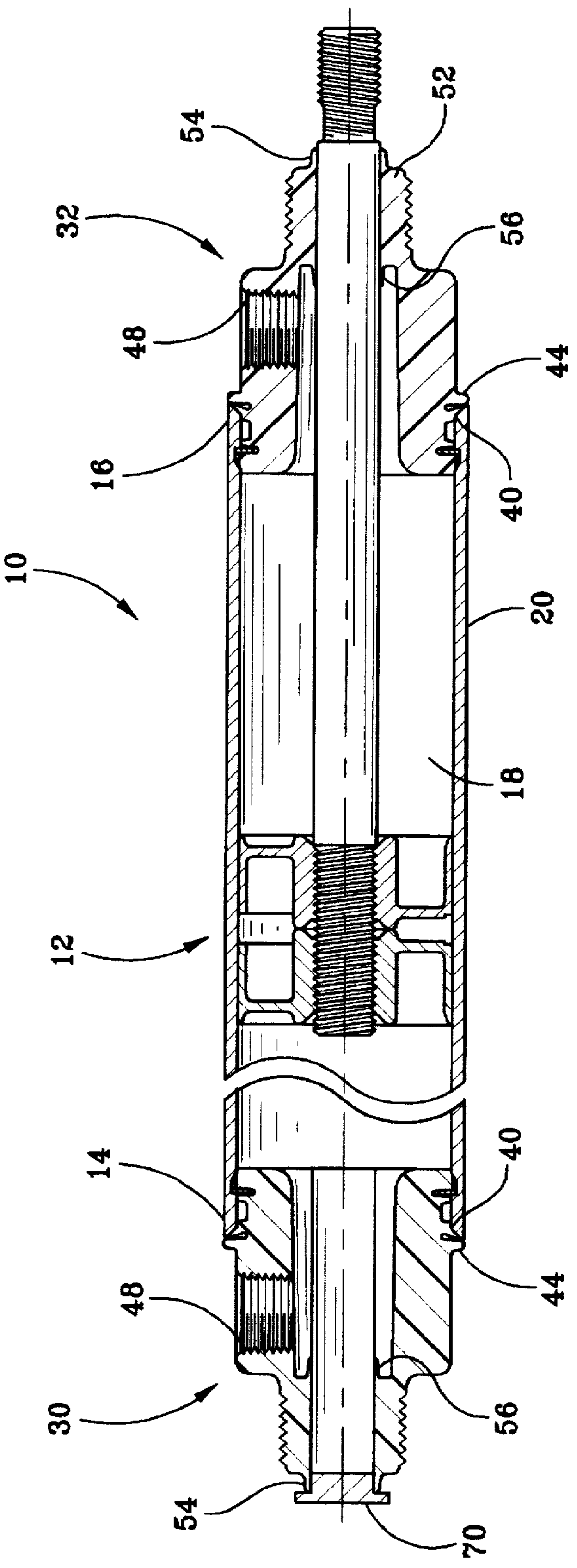

Referring now to the drawings, wherein similar reference characters designate corresponding parts throughout the several views, FIG. 1 shows a fluid cylinder generally indicated at 10 which includes an elongate cylindrical piston tube 12 having open ends 14 and 16 and piston cheer 18 that is defined by cylindrical wall 20 of the piston tube 12. An inwardly tapered chamfer 22 is provided at the outer edge of each of the piston tube ends 14 and 16. The chamfer is oriented at about 45° relative to sidewall 20. It is contemplated that the tube 12 may include only one open end.

Figures 2A, 2B:
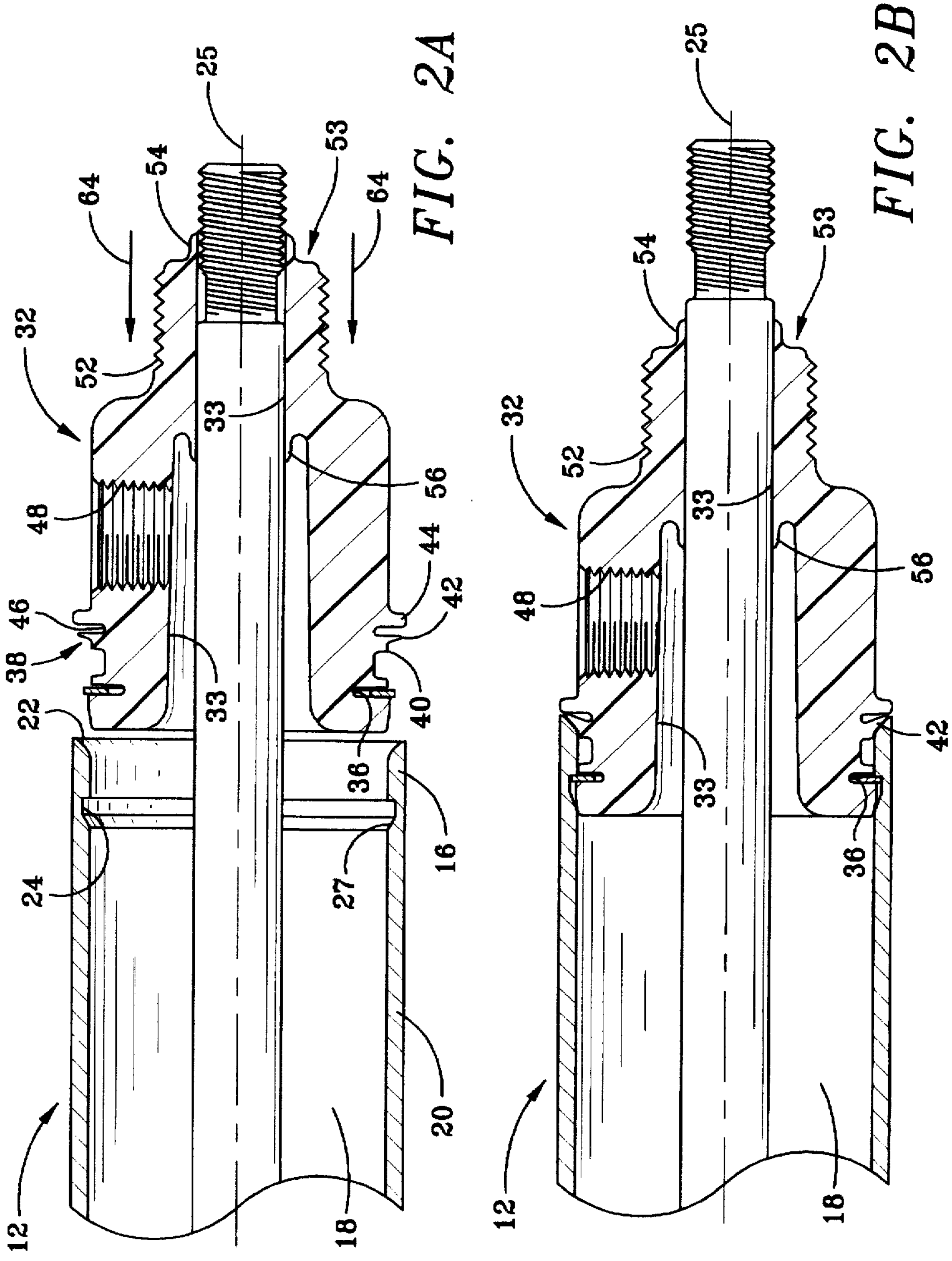
Figure 3:
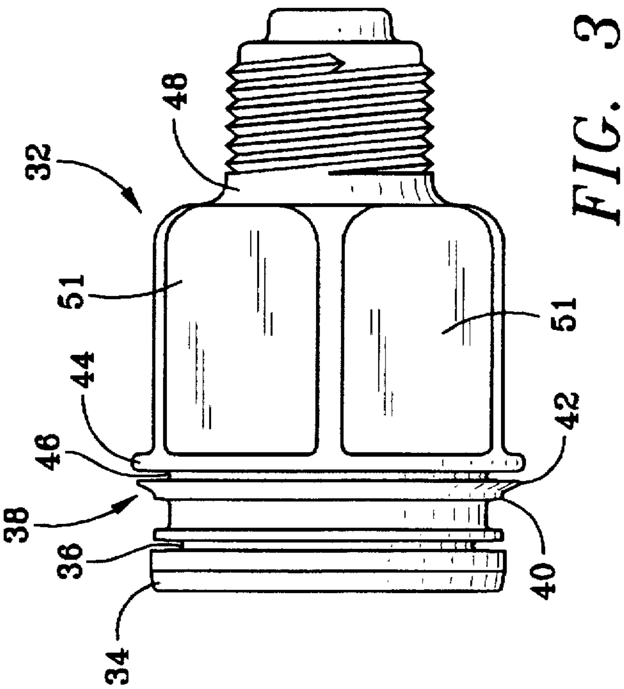
FIG. 3 is an elevational view of an endcap of the present invention fluid cylinder.

As shown in FIGS. 2*a* and 2*b*, an annular groove 24 is formed in piston tube sidewall 18 adjacent chamfered outer edge 22, at each end 14 and 16. The groove 24 is comprised of a cylindrical portion and a conical portion 27 which joins the cylindrical portion and sidewall 20.

Ends 14 and 16 are closed by like endcaps 30 and 32 respectively. However, if the piston tube included only a single open end, then only a single endcap would be needed to close the single open end. The endcaps will be discussed in greater detail hereinbelow.

Piston member 26 is threadably connected to elongate rod 28 to be movable with the rod, through chamber 18, along axis 25. The piston member 26 will be described in further detail hereinbelow. The piston is threadably connected to the rod however, the piston may be connected to the rod using any suitable conventional attachment means. The free end of the rod extends through passage 33 of endcap 30. It should be understood that in an alternate embodiment, the rod may have a pair of free ends with each of the ends extending through an endcap passage.

Endcaps 30 and 32 are made from a conventional compressible material, such as an elastomer, and are preferably manufactured by a conventional molding process. The most effective seals are formed between the endcaps and piston tube 12 when the endcap is made from a material that is more compressible than the piston tube material.

The endcaps 30 and 32 are substantially the same, so that as the description proceeds only endcap 32 will be described.

Referring now to FIGS. *2a*, *2b* and 4, unitary endcap 32 has a substantially cylindrical body that includes a leading end 34, trailing end 53, and an annular groove 36 formed in the leading end. The leading end 34 is provided with a relatively small inward taper which permits the leading end of the endcap to be more easily inserted into the open tube end 16 during fluid cylinder assembly. Additionally, the leading end forms a primary seal with sidewall 20 when the endcap is located in the open end.

Groove 36 is adapted to receive a conventional, annular retaining ring 50 that is compressible radially. During cylinder assembly, the retaining ring is initially compressed radially by engagement with chamfered edge 22 and is compressed in groove 36 until the piston tube end 16 is closed by endcap 32. Then, the retaining ring 50 expands radially into locking groove 24. See FIG. *2b*. In this way, the endcap is maintained in the open end 16 by retaining ring 50.

Located adjacent groove 36 along the exterior of the endcap 32 is annular sealing member indicated generally at 38. The annular sealing member is formed along the exterior of the endcap between the leading end 34 and annular shoulder 44, and is comprised of base 40 and lip 42 made integral with the base. The lip extends radially outwardly from the base and includes a chamfer which faces the endcap leading end. The chamfer has an angle of about 45° relative to the base 40, and is adapted to sealingly engage the chamfered edge 22 when the endcap is inserted in end 16.

The shoulder and sealing member 38 define a recess 46 which extends annularly around the outside of the endcap. The recess provides the required amount of flexure of the lip.

The lip is relatively flexible and is adapted to be flexed between a first position where the lip 42 is substantially parallel to the shoulder 44 as shown in FIG. *2a*, and a second position where the lip is in abutment with the shoulder as shown in FIG. 1. When the endcap is located in open end 16, the lip is sandwiched between the chamfered edge 22 and the shoulder 44 and sealingly engages the edge and by such sealing engagement forms a secondary seal with the piston tube 12.

Fluid port 48 is formed in the endcap body and serves to flow connect the passageway 33 with the exterior of the endcap. The port permits a fluid such as air to be flowed into or exhausted from chamber 18, in order to move piston member 26 in a reciprocating manner through chamber 18.

Figure 5:
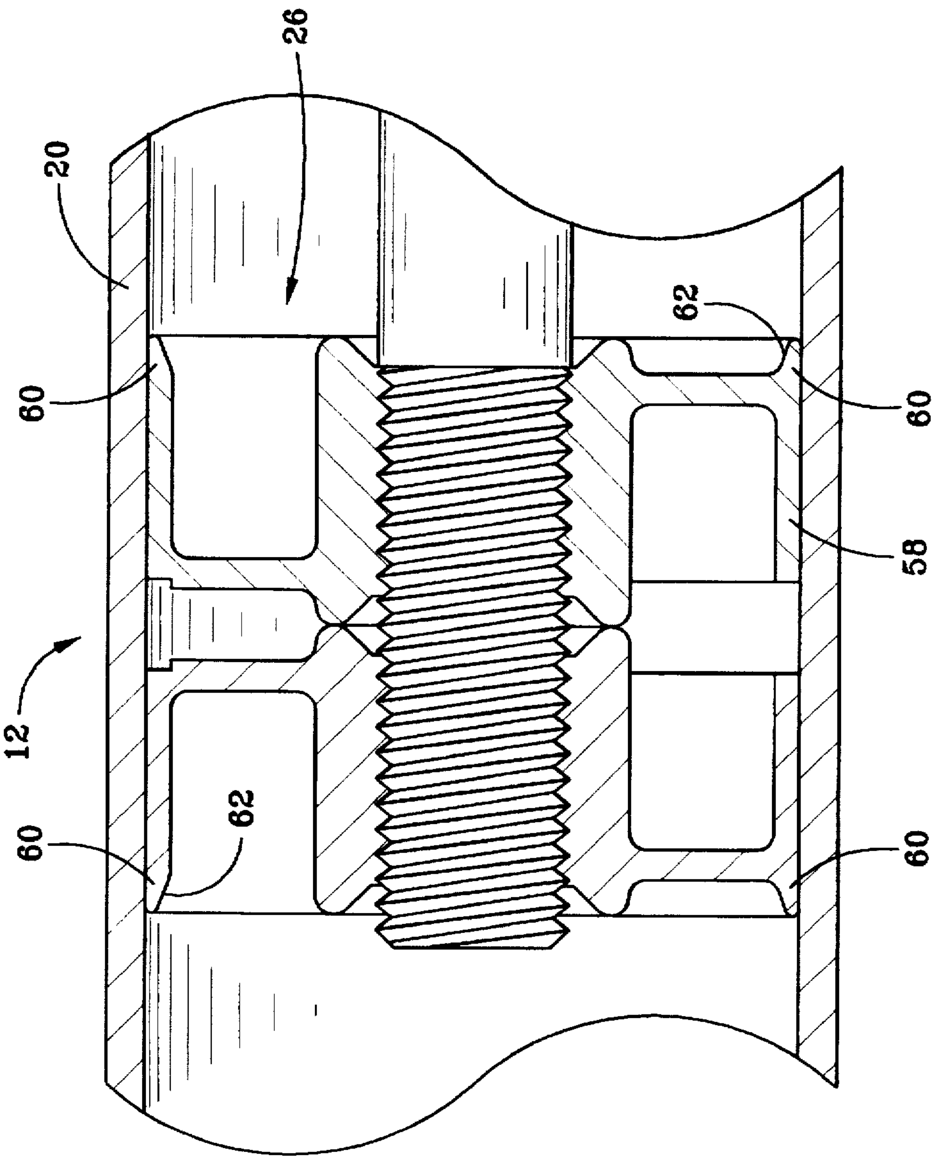
FIG. 5 is an enlarged view of the sectional view of FIG. 1, showing the fluid cylinder piston.
Figure 4:
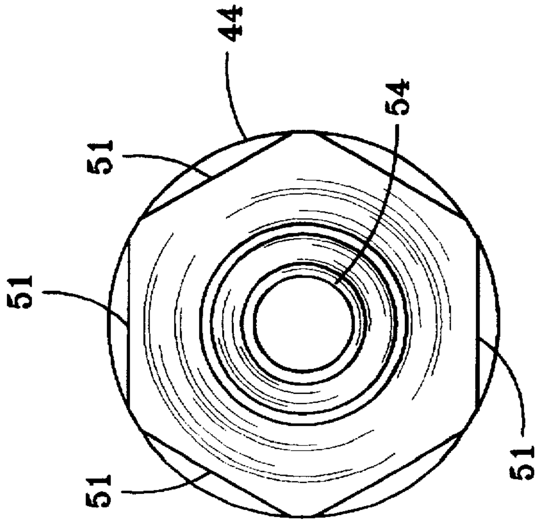
FIG. 4 is an end view of the endcap shown in FIG. 3.

The fluid port 48 may be repositioned relatively simply by an operator by rotating the endcap about axis 25. Flat surfaces 51 formed along the exterior of the endcap, are arranged to form a hexhead profile, and serve to assist in the repositioning of the endcap. The hexhead configuration is shown in FIG. 5. A wrench or other conventional tool may be used to grip and rotate the endcap. The flat surfaces allow the operator to change to the location of port 48 with ease, using conventional tools.

Hub 52 is made integral with the endcap at trailing end 53. The passageway 33 extends through the endcap and includes a relatively narrow portion defined by the hub and a relatively wide portion that extends through the leading end 34. The hub includes first and second annular sealing means 54 and 56, made integral with the hub. The first and second sealing means are for sealingly engaging rod 28 which extends through passageway 33. See FIGS. *2a* and *2b*. The first sealing means extends axially away from the endcap along the endcap exterior, and the second sealing means extends away from the hub into the wide portion of the passageway. The first sealing means primarily serves to prevent foreign matter along the rod from entering the chamber 18. The second sealing means serves to maintain a pressure differential between the interior chamber 18 and ambient environment.

As shown in FIG. 1, cap 70 is seated in hub 52 of endcap 30 and serves to close and seal passage 33 during operation of cylinder 10. If in an alternate embodiment of fluid cylinder 10 the piston rod 26 extends through passage 33 of endcap 30, the cap 70 would not be required.

Turning to the piston member 26 shown in FIG. 5, the piston member is substantially cylindrical, is connected to one end of rod 28, and is adapted to be movable linearly along axis 25 through chamber 18 with the rod. The piston includes a sidewall 58 that includes outwardly directed sealing portions 60 at both ends of the sidewall 58. The sealing portions sealingly engage the chamber sidewall 20 and in this way prevent fluid from leaking past the piston during operation of cylinder 10. As shown in FIG. 5, the inner portions of outer edges of the sidewall 58 include chamfers 62. During operation of cylinder 10, fluid in the chamber 18 flows against the chamfered inner portions and forces the sealing portions into engagement with sidewall 20.

Assembly of fluid cylinder 10 will now be described. Piston 26 is connected to rod 28. The subassembly comprised of the piston and rod is slid into chamber 18 of tube with the sealing portions 60 of the piston member in sealing engagement with the sidewall 20 of the piston tube chamber 18.

Retaining rings 50 are slid over leading ends 34 of endcaps 30 and 32 and are located in annular grooves 36. At this step in the assembly of fluid cylinder 10, the retaining rings are seated in the grooves are not compressed radially.

Each endcap closes the respective open end in the following manner. Endcap 32 is moved longitudinally along axis 25 in the direction generally indicated by arrows 64. As the endcap is moved toward end 16, retaining ring 50 engages chamfered edge 22 and by this engagement is compressed radially inwardly into groove 36. As endcap 32 is moved further into end 16, the retaining ring is maintained in compression by the portion of the chamber wall joining edge 22 and groove 24.

As the endcap 32 closes end 16 the following occurs substantially simultaneously. Annular lip 42 sealingly engages chamfered edge 22 and is flexed to the second position and into abutment with shoulder 44 so that the lip is sandwiched between the edge 22 and shoulder 44. Concurrently, the retaining ring 50 moves into groove 24 and is expanded radially. Once expanded, the retaining ring serves to maintain the endcap in end 16. The lip 42 provides an axial force that balances the forces produced by the expanded retaining ring.

When the endcap is in place in the open end 16, a primary seal between the endcap and tube 12 is produced by engagement between the leading end 34 and conical portion of groove 24 and a secondary seal between the tube and endcap is produced by engagement between the lip 42 and edge 22.

Additionally a seal is formed between the chamber wall 20 and piston sealing portions 62, and an additional seal is formed between the first and second sealing means 54 and 56 and the piston rod 28. Use of a number of discrete seal members is not required.

Once the endcaps are in the ends, the endcaps may be rotated in order to reposition flow ports 48 as required. The chamfer angle provided at end 22 and lip 42 may be greater or less than the 45° angle disclosed and in this way, the amount of torque required to rotate the endcaps and reposition the flowports can be increased or decreased.

Figure 6:
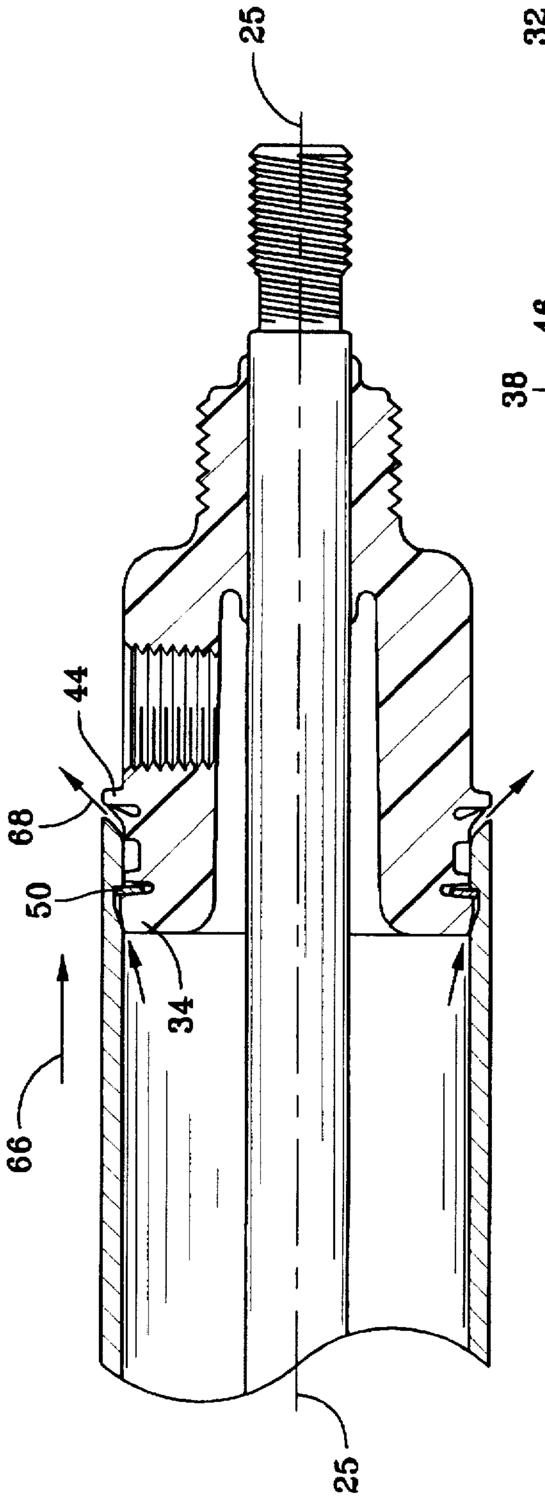
FIG. 6 is a sectional view like views 2*a* and 2*b*, showing the means for relieving over pressurization of the fluid cylinder chamber.

In operation, if chamber 18 is over pressurized with a fluid such as air, the endcap permits the excess volume of the fluid to be bled out of the chamber 18. Referring to FIG. 6 which shows the means for reducing over pressurization of chamber 18, the fluid in chamber 18 presses against leading end 34. The pressure of the fluid displaces the endcap a small distance outwardly along axis 25 in the direction shown by arrow 66 decreasing the effectiveness of the primary and secondary seals between the endcap and sidewall 20. The fluid moves past the leading end and flexes the retaining ring 50 in groove 36. The combination of the decreased effectiveness of the primary seal and flexure of retaining ring 50 permits the fluid to move past the leading end and ring. The relatively small axial displacement of the endcap also the decreases effectiveness of the secondary seal between the lip and chamfered edge 22 and permits the excess volume of fluid to move past the secondary seal in the direction generally indicated by arrow 68.

When the required volume of fluid has escaped from chamber 18 in the manner described, the primary and secondary seals are reassumed with the required effectiveness, and the retaining ring returns to its original unflexed orientation.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

Having described the invention, what is claimed is:

1. A fluid cylinder comprising:

a) a tube having a sidewall and at least one open end, the sidewall having a locking groove formed therein adjacent the at least one open end, the at least one open end including an outer edge;

b) at least one endcap for closing the at least one open end, the at least one endcap comprising: an exterior, a leading end having a groove formed therein, said groove adapted to receive a compressible retaining ring, the retaining ring adapted to engage the locking groove when the at least one open end is closed by the at least one endcap; a shoulder; and a sealing member located between the leading end and the shoulder, said sealing member and shoulder being located along the at least one endcap exterior, said sealing member adapted to sealingly engage the outer tube edge and abut the shoulder when the at least one open end is closed by the at least one endcap.

2. The fluid cylinder as claimed in claim 1 wherein the outer edge of the tube includes a chamfer.

3. The fluid cylinder as claimed in claim 1 wherein the groove formed on the tube sidewall includes a cylindrical portion and a conical portion, said leading end is adapted to sealingly engage the conical portion.

4. The fluid cylinder as claimed in claim 1 wherein the at least one endcap includes a trailing end with a hub formed at the trailing end, the at least one endcap defining an interior passageway having a narrow portion defined by the hub and a wide portion said hub including first and second sealing means made integral with the hub, said sealing means for forming a seal with a connecting member adapted to move through the passageway.

5. The fluid cylinder as claimed in claim 4 wherein the first sealing means extends axially along the exterior of the endcap and the second sealing means extends axially away from the hub into the wide portion of the passageway.

6. The fluid cylinder as claimed in claim 1 wherein the endcap is made from an elastomer.

7. The fluid cylinder as claimed in claim 4, wherein the connecting member is a rod, said fluid cylinder further including a piston member connected to the rod adapted to be movable through the chamber along an axis, the piston including a body, outwardly directed portions along the body exterior, the portions sealingly engage the tube sidewall, the piston further including chamfered portions along the interior of the piston body.

8. The fluid cylinder as claimed in claim 1 wherein the at least one endcap includes a plurality of flat surfaces arranged to form a hexhead.

9. The fluid cylinder as claimed in claim 1 wherein the leading end of the endcap is adapted to form a primary seal with the tube sidewall when the at least one open end is closed by the at least one endcap.

10. A fluid cylinder comprising:

a) a tube having a sidewall and at least one open end, the sidewall having a locking groove formed therein adjacent the at least one open end, the at least one open end includes an edge which includes a chamfer;

b) at least one endcap for closing the at least one open end, the at least one endcap comprising: a leading end having a groove formed therein, said groove adapted to receive a compressible retaining ring, the retaining ring adapted to engage the locking groove when the at least one open end is closed by the at least one endcap; a shoulder; and a sealing member located between the leading end and the shoulder, said sealing member adapted to sealingly engage the edge of the at least one open end, the sealing member includes a base and a lip made integral with the base, the lip including along one side, a chamfer adapted to engage the chamfered tube edge, said lip adapted to be movable between a first position where the lip is substantially parallel to the shoulder and a second position where the lip is in abutment with the shoulder.

11. The method of assembling a fluid cylinder that includes a piston tube having a sidewall which defines a piston tube chamber, the piston tube having at least one open end having an edge and a groove formed along the sidewall; at least one endcap to close the at least one open end, the endcap including a leading end having a groove, a retaining member seated in the groove, a shoulder and a movable sealing member located between the leading end and shoulder, the method comprising the following steps:

a) moving the at least one endcap into an associated open end and engaging the retaining member with the edge of the open end, and compressing the retaining member into the groove;

b) moving the at least one endcap along an axis until the retaining member is located in the groove;

c) engaging the leading end with the groove to form a primary seal;

d) engaging the sealing member with the at least one edge to form a secondary seal and flexing the sealing member from a first position where the sealing member is substantially parallel to the shoulder to a second position where the sealing member is in abutment with the shoulder.

12. The method of claim 11 wherein each endcap includes a flow passage, the method further comprising the step of rotating at least one of the endcap about an axis to reposition the flow passage, after step d).

13. The method of claim 11 comprising the additional step after step d) of correcting over pressurization of the piston chamber, the further step comprising, displacing the leading end along the axis outwardly from the first end, flexing the retaining member, moving the sealing member out of engagement with the edge, thereby allowing the required volume of fluid to be bled from the over pressurized chamber.

14. The method of claim 12 further comprising the step of returning the retaining member to its original orientation and recreating the primary and secondary seals after the required volume of fluid is bled from the piston chamber.

15. An endcap for a fluid cylinder, the endcap comprising: a body having a first end and an interior; a hub made integral with the body at the first end, the endcap body defining an interior passageway adapted for movement of a fluid cylinder connection member therethrough, said passageway having a narrow portion defined by the hub and a wide portion, said hub including first and second sealing means made integral with the hub, said sealing means for forming a seal with the connection member to thereby prevent foreign matter from entering the body interior.

16. The fluid cylinder endcap as claimed in claim 15 wherein the first sealing means extends axially along the exterior of the endcap and the second sealing means extends axially away from the hub into the wide portion of the passageway.

17. The fluid cylinder endcap as claimed in claim 15 wherein the endcap is made from an elastomer.

18. The fluid cylinder endcap as claimed in claim 15 wherein the endcap body includes a second end having a groove formed therein, the groove being adapted to receive a compressible locking member, said endcap also including a shoulder made integral with the body between the two body ends and a flexible lip adapted to be flexed and thereby sealingly engage the shoulder.

19. The fluid cylinder endcap as claimed in claim 15 wherein the endcap includes a plurality of flat surfaces arranged to form a hexhead along the endcap body.

* * * * *